INVENTOR
CHUNG Y. SHEN
BY
ATTORNEY

United States Patent Office 3,772,374
Patented Nov. 13, 1973

3,772,374
PROCESS FOR PREPARING ALKALI METAL
NITRILOTRIACETATES
Chung Yu Shen, St. Louis, Mo., assignor to Monsanto
Company, St. Louis, Mo.
Continuation of abandoned application Ser. No. 624,376,
Mar. 20, 1967. This application Aug. 9, 1971, Ser.
No. 170,386
Int. Cl. C07c 101/26
U.S. Cl. 260—534 E                               7 Claims

ABSTRACT OF THE DISCLOSURE

A process is described for preparing alkali metal nitrilotriacetate by hydrolyzing nitrilotriacetonitrile dissolved in an aqueous solution containing an alkali metal hydroxide at a temperature of from about 90° C. to about 150° C. with the alkali metal hydroxide being in an excess amount sufficient to rapidly convert said nitrile to alkali metal nitrilotriacetate and form an aqueous alkali metal hydroxide solution containing alkali metal nitrilotriacetate crystals, and recovering the alkali metal nitrilotriacetate crystals from the solution.

Figure 1:
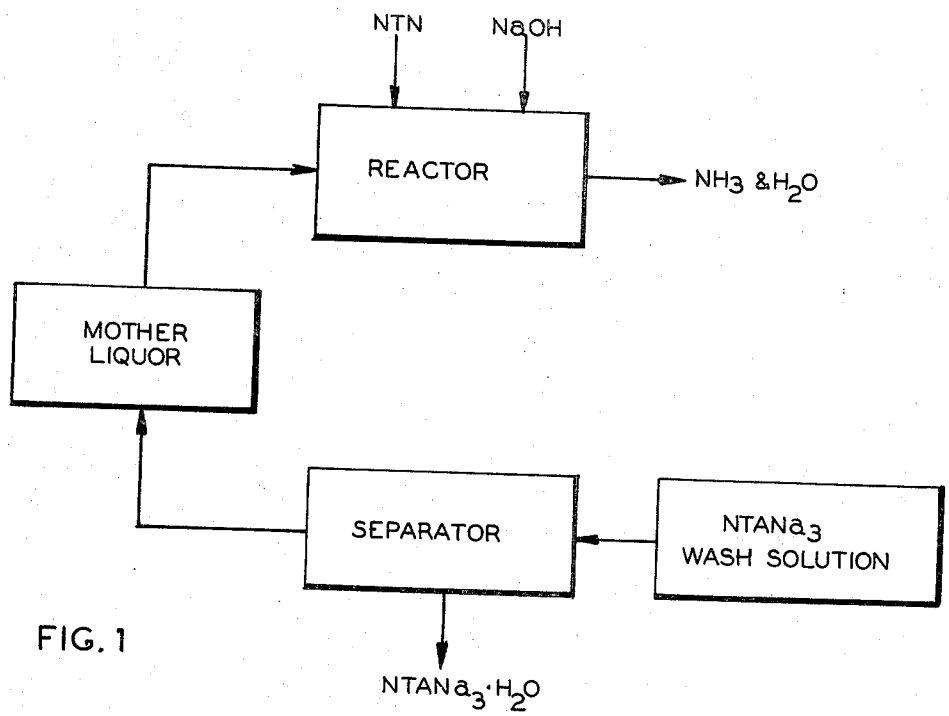

This application is a continuation of Ser. No. 624,376, filed Mar. 20, 1967, now abandoned.

This invention relates to a process for preparing alkali metal nitrilotriacetates and, more particularly, a process for the alkaline hydrolysis of nitrilotriacetonitrile to an alkali metal nitrilotriacetate salt and the concomitant crystallization of the salt, especially trisodium nitrilotriacetate.

It is known that using stoichiometric amounts of caustic in the alkaline hydrolysis of nitrilotriacetonitrile gives low yields of the desired sodium nitrilotriacetate product as well as an off-color product. Moreover, usually the time necessary for the hydrolysis is extremely long. In U.S. Pat. No. 3,183,262 there is disclosed a process for preparing crystalline sodium nitrilotriacetate from the corresponding nitrile by carrying out the alkaline hydrolysis (saponification) process and the crystallization process in two separate and distinct stages. As described, excess caustic is used in the crystallization process in order to reduce the solubility of the sodium nitrilotriacetate product or salt out the product and thus enable better yields of the crystalline product to be obtained. Because of the requirement for a separate hydrolysis step and crystallization step, a rather long process time is generally necessary in practicing this method. Moreover, the foregoing described method indicates that the hydrolysis step and the crystallization step must be separate and distinct when using excess caustic because if excess caustic was used in the hydrolysis step the solubility of nitrilotriacetonitrile and/or sodium nitrilotriacetate would be reduced and salted out giving low yields and numerous by-products. It has been unexpectedly found, however, that contrary to the teaching of the foregoing method the alkaline hydrolysis of nitrilotriacetonitrile to the nitrilotriacetate salt product and the crystallization of said product can be carried out, under certain conditions, in the same step and achieve numerous process advantages which include, inter alia, faster processing time, higher yields of the desired product and a better product color.

Accordingly, it has been found that alkali metal nitrilotriacetate can be prepared by hydrolyzing nitrilotriacetonitrile dissolved in an aqueous solution containing an alkali metal hydroxide at a temperature of from about 90° C. to about 150° C. with said alkali metal hydroxide being in an excess amount sufficient to rapidly convert said nitrile to alkali metal nitrilotriacetate and form an aqueous alkali metal hydroxide solution containing alkali metal nitrilotriacetate crystals, and recovering said alkali metal nitrilotriacetate crystals from said solution, as will be more fully discussed hereinafter.

Nitrilotriacetonitrile (NTN) can be prepared by various methods such as those described and disclosed in U.S. Pats. Nos. 2,855,428 and 3,061,628.

In general, any alkali metal nitrilotriacetate can be prepared by use of the corresponding alkali metal hydroxide, such as lithium hydroxide, sodium hydroxide, potassium hydroxide, rubidium hydroxide, cesium hydroxide and the like with sodium hydroxide and potassium hydroxide being preferred due to their availability and inexpensiveness and sodium hydroxide being particularly preferred.

For the alkaline hydrolysis, amounts of alkali metal hydroxide in excess of stoichiometry, that is, an OH⁻/NTN molar ratio greater than 3:1, respectively, are necessary in order to rapidly convert the nitrile to the corresponding triacetate salt as well as form an aqueous mother liquor with a sufficient hydroxide concentration to readily crystallize the triacetate therefrom. As used herein, indicated amounts of the reactants are preferably maintained throughout the hydrolysis reaction but are especially necessary for the rapid conversion of the last few percent, that is, about 10% to 25% by weight, of nitrilotriacetonitrile to the corresponding triacetate salt. Thus, molar ratios of OH⁻/NTN of greater than about 3.6:1 are necessary and it is preferred to have the alkali metal hydroxide in as high an excess amount as possible, however, molar ratios of OH⁻/NTN of greater than about 50:1 or 100:1, respectively, are not desirable if the excess hydroxide is to be recycled due to the expense of handling and recycling the excess hydroxide. It is especially preferred, therefore, that the molar ratio of OH⁻/NTN be from about 3.6:1 to 10:1, respectively.

Additionally, the hydrolysis reaction should be conducted in an aqueous medium containing the reactants (nitrilotriacetonitrile and alkali metal hydroxide) dissolved therein. In general, the aqueous medium should be sufficient to provide a suitable reaction medium for the reactants and this is usually at least about 10% of water per total reaction mixture of reactants and water. Amounts as high as 85% to about 95% by weight of water per total reaction mixture of reactants can be used although such amounts and those in excess are usually not desirable because of the degree and expense of processing required to remove such large amounts of the aqueous medium. It is preferred, therefore, that the amount of aqueous medium be from about 10% to about 50% by weight of the total reaction mixture. Thus, the concentration of the reactants can vary widely but preferably the concentration of the alkali metal hydroxide in the aqueous medium after hydrolysis should not be greater than about 50% by weight or less than about 5% by weight and preferably from about 8% to about 25%.

Since the rate of alkaline hydrolysis is temperature dependent and the hydrolysis reaction is exothermic, it is preferred to carry out the reaction at temperatures of from about 90° C. to about 150° C. It is completely unexpected that the resulting nitrilotriacetate is stable under the extremely alkaline conditions of the reaction at these high temperatures. Moreover, a decided advantage to the process of the present invention is that the crystallization of alkali metal nitrilotriacetate proceeds quite well, along with the hydrolysis reaction, at these temperatures and thus cooling of the reaction solution for crystallization purposes is not required.

In general, the hydrolysis reaction can be accelerated by use of pressures in excess of atmospheric pressures and such is dependent on, inter alia, the partial vapor pressure of ammonia and water evolved during the reaction. Usually a pressure less than 2,000 p.s.i.g. is all that is necessary and preferably less than 1,000 p.s.i.g., with pressures from above atmospheric pressure to about 500 p.s.i.g. being especially preferred. When using temperatures for the hydrolysis reaction of less than about 110° C. the reaction can be carried out, if desired, without the use of pressures in excess of atmospheric. However, for temperatures of the hydrolysis reaction above about 110° C. pressures in excess of atmospheric as previously described are usually required.

In general, the hydrolysis reaction can be carried out by bringing together the nitrilotriacetonitrile reactant and the alkali metal hydroxide reactant by dissolving each reactant, either simultaneously or intermittently and in any order, in the aqueous reaction solution. It is preferred to first form the aqueous solution containing the alkali metal hydroxide dissolved therein and then adding the nitrilotriacetonitrile thereto. Or, if desired, each of the reactants may be dissolved in an aqueous solution and the resulting solutions admixed. In any event, it is preferred that the reactants be intimately contacted in order to achieve the advantages of the present invention and, thus, usually some degree of agitation, dispersion, or admixing of the reactants is required during the hydrolysis reaction.

The reaction can be carried out by many and various methods. For example, in a batch process the alkali metal hydroxide solution can be prepared in a suitable reaction vessel equipped with a stirrer and the nitrilotriacetonitrile added either continuously or intermittently to the hydroxide solution under agitation. After hydrolysis the desired product crystals can be separated from the mother liquor. This process also can be carride out cyclically by recycling the mother liquor back to the reaction vessel for re-use.

Another method which can be used in a continuous method whereby the reactants are continuously fed into suitable reaction vessels with the rate of feed of the reactants as well as other reaction conditions, such as temperature, used to insure the continuous recovery of the desired product crystals. This can be accomplished by, for example, a series of reaction vessels and separators in which the hydrolysis reaction is carried out in one or more reaction vessels and the mother liquor containing the desired product crystals is passed to a separator for recovery of the crystals and recycling of the mother liquor back to a reaction vessel for re-use. The sojourn times in each step can be coordinated such that each are about equal thus resulting in a relatively continuous passing of reactants into the reaction and exiting of the desired product crystals.

In general, the alkali metal nitrilotriacetate crystals can be recovered from the alkaline hydrolysis solution by many and various mehods which include decantation, filtration, centrifuging and the like. The recovered triacetate crystals quite advantageously are usually of improved color, that is, a color of less than 100 on the APHA scale and usually less than 60 APHA (measured on a solution obtained by dissolving the crystals in distilled water to a 40% concentration), and are usually of improved particle size, that is, essentially greater than about 275 mesh with usually particle sizes between about +200 mesh to about −10 mesh (U.S. Screen Series) and preferably over 85% being greater than about +200 mesh. They are useful in many different applications and are especially useful for dissolving in aqueous media to sequester or chelate metal ions.

Figure 2:
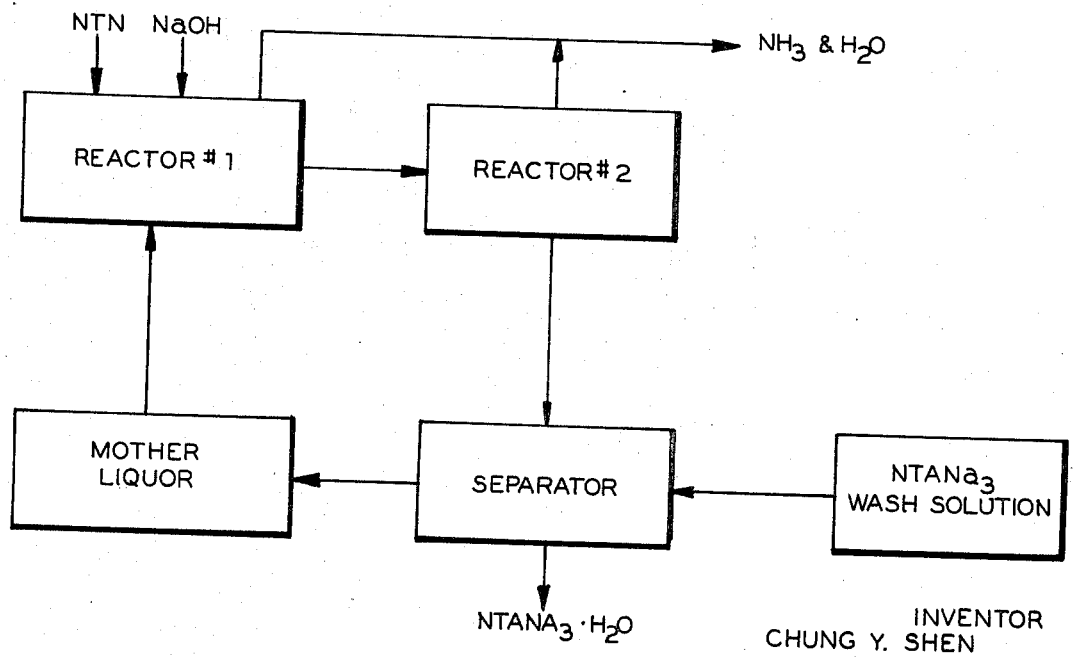

In order to facilitate the description and understanding of this invention, reference is made to the appended drawing in which:

FIG. 1 is a schematic flow sheet showing a batch type process for preparing sodium nitrilotriacetate by alkaline hydrolysis of nitrilotriacetonitrile, and FIG. 2 is a schematic flow sheet showing a continuous type process for preparing sodium nitrilotriacetate by alkaline hydrolysis of nitrilotriacetonitrile.

Referring now to FIG. 1 which illustrates a batch type process for preparing sodium nitrilotriacetate according to the present invention. An aqueous solution of sodium hydroxide (NaOH) is prepared in the Reactor with a concentration of from about 15% to about 35% by weight. To this is added nitrilotriacetonitrile (NTN) crystals over a period of time of about 0.6 to 2 hours and at a rate of addition about equal to the rate of ammonia ($NH_3$) and water ($H_2O$) vapor evolved from the reaction. The hydrolysis reaction, being exothermic, is maintained at a temperature of from about 95° C. to about 110° C. The reaction solution is heated to a boil (temperature above about 100° C.) for about ½ to 1 hour thus ensuring removal of ammonia and water vapor until the NaOH concentration is greater than about 15% by weight. The reaction solution is then passed to the Separator where the sodium nitrilotriacetate ($NTANa_3 \cdot H_2O$) crystals are separated from the mother liquor (aqueous solution containing excess NaOH) by, for example, a centrifuge or a filter. The wet crystal cake is then preferably washed with an aqueous wash solution ($NTANa_3$ wash solution) near saturation, 40 to 50% by weight, with sodium nitrilotriacetate and containing less than about 2% NaOH. The mother liquor from the Separator an be recycled, if desired, to the reactor for re-use in the process.

It is often advantageous when the nitrilotriacetonitrile crystals give processing problems such as poor flow properties and poor dispersion in the aqueous solution to use as the feed in the Reactor a concentrated, hot aqueous nitrilotriacetonitrile solution such as from about 50% to 90% concentrated and at a temperature of from about 90° C. to about 100° C. However, when such is used, it is preferred to use an inert gas such as nitrogen, steam, air and the like or adjust the pH of the solution to less than 6, preferably from 4 to 6, with an acid such as nitrilotriacetic acid or a strong mineral acid, such as $H_2SO_4$, HCl, $H_3PO_4$ and the like, in order to minimize the formation of polymer material and other by-products which can form when the nitrilotriacetonitrile solution is added to the alkaline solution in the Reactor.

The following example is presented to illustrate this embodiment of the invention, with parts and percentages by weight being used unless otherwise indicated.

EXAMPLE I

An aqueous mother liquor containing a wash solution (Recycle Liquor) is charged to the Reactor and an aqueous NaOH solution and water are added thereto. The temperature of the solution rises to about 70° C. due to the heat of dilution of the caustic. Some crystals of trisodium nitrilotriacetate monohydrate begin to salt out. This is believed advantageous since these crystals can act as seed crystals during the hydrolysis reaction. Nitrilotriacetonitrile is added at a rate of addition about equal to the rate of ammonia and water vapor evolved from the reaction mixture. The temperature of the mixture rises to about 98° C. and maintains this temperature throughout the nitrile addition. A "boil off" is carried out in order to insure that the reaction mixture is essentially free of ammonia. The sodium nitrilotriacetate crystals are separated from the mother liquor and washed. The following tabel reports the results in pounds for this method after reaching steady processing conditions.

TABLE 1

| Reactor input | | Reactor output | |
|---|---|---|---|
| Recycle liquor: | | Mother liquor: | |
| NTANa$_3$ | 3,342 | NTANa$_3$ | 2,606 |
| NaOH | 7,840 | NaOH | 7,882 |
| H$_2$O | 26,210 | H$_2$O | 25,400 |
| NaOH (50% conc.) | 14,800 | NTANa$_3$·H$_2$O (filter cake): | |
| NTN crystals (wet): | | NTANa$_3$·H$_2$O a | 17,085 |
| NTN | 7,950 | NaOH | 235 |
| H$_2$O | 880 | H$_2$O | 2,020 |
| H$_2$O (make-up) | 4,000 | NH$_3$ vapor: | |
| Total | 65,022 | NH$_3$ | 3,028 |
| | | H$_2$O | 6,766 |
| | | Total | 65,022 | a Crystal size—95% greater than 200 mesh. Color—<50 APHA.

The following table reports the time required for a batch process using similar amounts of reactants as reported in this example by following the procedure described as the second stage of Example V of U.S. Pat. 3,183,262 (A) as compared to the batch process described herein (B):

TABLE 2

| | Time (hours) | |
|---|---|---|
| | A | B |
| Mother liquor (charge and heating) | 0.50 | 0.30 |
| NTN addition | 2.50 | 1.50 |
| Boil-off | 1.75 | 0.60 |
| Cooling | .75 | (¹) |
| Caustic salting out | 1.00 | (¹) |
| Total | 6.50 | 2.40 |

¹ Not required.
NOTE.—NTN=Nitrilotriacetonitrile; NTANa$_3$=Trisodium nitrilotri acetate;j NTANa$_3$· H$_2$O=Trisodium nitrilotriacetate monohydrate crystals.

As can be appreciated from the above tables, the process of the present invention prepares the desired product, alkali metal nitrilotriacetate in excellent yield, purity, color, and particle size as well as permitting a much faster processing time (over twice as fast) as compared to a conventional alkaline hydrolysis process.

Referring now to FIG. 2 which illustrates a continuous type process for preparing sodium nitrilotriacetate according to the present invention. An aqueous solution of NaOH is maintained in the Reactor 1 with a concentration of from about 20% to about 50% by weight. To this is fed continuously or intermittently nitrilotriacetonitrile (NTN) crystals over a period of about 60 to 90 minutes and at a rate of addition about equal to the rate of ammonia (NH$_3$) and water (H$_2$O) vapor evolved from the reaction. The temperature of the reaction solution in Reactor 1 is maintained at about 80–100° C. When about 70% to 90% of the nitrilotriacetonitrile has been converted to the corresponding sodium salt the reaction solution is passed to Reactor 2 for completion of the hydrolysis and Reactor 1 is recharged with reactants as previously described. In Reactor 2 the reaction solution is maintained at a temperature of from about 100° C. to about 110° C. for a period of about 60 to 90 minutes for completion of the hydrolysis reaction. Moreover, the ammonia (NH$_3$) and water (H$_2$O) vapor are essentially removed until the NaOH concentration is greater than about 15% by weight. The reaction solution is then passed to the Separator where the sodium nitrilotriacetate (NTANAa$_3$·H$_2$O)

crystals are separated from the mother liquor (aqueous solution containing excess NaOH) by, for example, a centrifuge or a filter. The wet crystal cake is then preferably washed with an aqueous wash solution (NTANAa$_3$ wash solution) essentially saturated, 40% to 50% by weight, with sodium nitrilotriacetate and containing less than about 2% NaOH. The mother liquor from the Separator can be recycled, if desired, to Reactor 1 for re-use in the process. Each of the foregoing steps are carried out in such a manner that there is a continuous passing of material from one step to the next (plus recycling of the mother liquor) thus resulting in a continuous process.

Similarly to the batch type process previously described, a hot, concentrated aqueous solution of nitrilotriacetonitrile can be used, if desired, instead of nitrilotriacetonitrile crystals.

The following example is presented to illustrate this embodiment of the invention with parts and percentages by weight being used unless otherwise indicated.

EXAMPLE II

An aqueous mother liquor is charged to Reactor 1 and an aqueous NaOH solution and water are added thereto. Nitrilotriacetonitrile (NTN) crystals are slowly added to the foregoing over a period of about 75 minutes while the temperature is maintained at about 85° C. During this reaction ammonia (NH$_3$) and water (H$_2$O) vapor are evolved from the reaction. This reaction mixture is passed to Reactor 2 and another charge similar to the foregoing is charged to and reacted in Reactor 1. The temperature of the mixture in Reactor 2 is maintained at about 100–110° C. for about 75 minutes with more NH$_3$ and H$_2$O vapor being evolved from the reaction mixture. This material is passed to a centrifuge where the sodium nitrilotriacetate crystals are separated from the mother liquor and washed. In the same sequence of steps the reaction mixture of Reactor 1 is passed to Reactor 2 for processing as described and a further charge is added to Reactor 1 and processed as described. The resulting mother liquor is recycled back to Reactor 1 for use with a fresh charge. A material balance on an hourly basis made after continuous processing is established gives the indicated results in the following table.

TABLE 3

| | NTN | NTANa$_3$ | NTANa$_3$·H$_2$O | NAOH | NH$_3$ | H$_2$O | Mother liquor | | | Wash solution | | |
|---|---|---|---|---|---|---|---|---|---|---|---|---|
| | | | | | | | NTANa$_3$ | NaOH | H$_2$O | NTANa$_3$ | NaOH | H$_2$O |
| 1 Reactor 1: | | | | | | | | | | | | |
| Input | 3,050 | | | ¹ 5,680 | | 1,530 | 1,280 | 3,000 | 10,020 | | | |
| Output | 330 | 1,130 | 5,780 | 3,400 | ² 1.035 {1,060 / 1,859} | | | | | | | |
| Reactor 2: | | | | | | | | | | | | |
| Input | 330 | 1,130 | 5,780 | 3,400 | | 1,859 | | | | | | |
| Output | | 987 | 6,527 | 3,153 | ² 125 {1,530 / 10,177} | | | | | | | |
| 3 Centrifuge: | | | | | | | | | | | | |
| Input | | 987 | 6,527 | 3,153 | | 10,177 | | | | 298 | 14 | 455 |
| Output | | | ³ 6,527 | 167 | | 662 | 1,280 | 3,000 | 10,020 | | | |

¹ NaOH aqueous solution 50% concentrated.
² NH$_3$ and H$_2$O vapor.
³ Crystal size—essentially above 200 mesh. Color—<40 APHA.

NOTE.—NTN=nitrilotriacetonitrile; NTANa$_3$=trisodium nitrilotriacetate; NTANa$_3$·H$_2$O=trisodium nitrilotriacetate mono-hydrate crystals.

If higher pressures and temperatures can be maintained, a very rapid hydrolysis of nitrilotriacetonitrile can be carried out and the following example is presented to illustrate this embodiment of the invention with parts and

EXAMPLE III

A solution prepared by dissolving 1340 lbs. of nitrilotriacetonitrile crystals into 325 lbs. of water at 95° C. is fed continuously into a tubular reactor in which it is mixed with 2400 lbs. of 50% NaOH and a recycle mother liquor containing 563 lbs. trisodium nitrilotriacetate, 1320 lbs. of NaOH, and 4410 lbs. of water. The mixture is kept at 120° C. and under a total pressure of 500 p.s.i.g. for a period of about 3 minutes before it is flashed into a letdown drum to separate the magma or mother liquor containing trisodium nitrilotriacetate crystals and $NH_3$ and $H_2O$ vapors. Analyses show that all nitrilotriacetonitrile is converted to trisodium nitrilotriacetate. The magma after a brief steam stripping (about 15 minutes) to remove the last trace of dissolved ammonia is centrifuged to recover a 99+% pure trisodium nitrilotriacetate crystalline material essentially free of any odor.

What is claimed is:

1. A process for preparing sodium nitrilotriacetate, said process comprising admixing nitrilotriacetonitrile with a 15% to 35% by weight aqueous solution of sodium hydroxide to form a reaction mixture; hydrolyzing the nitrilotriacetonitrile to form crystalline sodium nitrilotriacetate, a molar ratio of hydroxide to nitrilotriacetonitrile of at least 3.6:1, and a reaction mixture temperature of from 90° C. to 150° C. being maintained during the hydrolysis, and separating said crystalline sodium nitrilotriacetate from the reaction mixture.

2. The process of claim 1 wherein the molar ratio of hydroxide in said aqueous solution to the total nitrilotriacetonitrile admixed therewith is from 3.6:1 to 10:1.

3. The process of claim 1 wherein said 15% to 35% aqueous solution of sodium hydroxide contains dissolved sodium nitrilotriacetate.

4. A process according to claim 1 wherein said nitrile is added to said sodium hydroxide solution at a rate of addition about equal to the rate of ammonia and water evolved during said hydrolysis of said nitrile.

5. A process according to claim 1 wherein said hydrolysis is carried out under pressure in excess of atmospheric pressure.

6. A process according to claim 1 wherein said temperature is from about 110° C. to about 150° C.

7. A process according to claim 1 wherein said nitrilotriacetonitrile is dissolved in an aqueous solution at a concentration of about 50 to 90 weight percent at a temperature from about 90° C. to 110° C. and is thereafter added to said aqueous solution of sodium hydroxide.

References Cited
UNITED STATES PATENTS

| | | |
|---|---|---|
| 3,061,628 | 10/1962 | Singer. |
| 3,183,262 | 5/1965 | Singer. |
| 2,388,189 | 10/1945 | Schweitzer. |

LORRAINE A. WEINBERGER, Primary Examiner

P. J. KILLOS, Assistant Examiner

PO-1050
(5/69)

UNITED STATES PATENT OFFICE
CERTIFICATE OF CORRECTION

Patent No. 3,772,374              Dated November 13, 1973

Inventor(s) Chung Yu Shen

It is certified that error appears in the above-identified patent and that said Letters Patent are hereby corrected as shown below:

In column 6, line 38, delete "85°C" and insert therefor --- 95°C ---.

Signed and sealed this 1st day of October 1974.

(SEAL)
Attest:

McCOY M. GIBSON JR.
Attesting Officer

C. MARSHALL DANN
Commissioner of Patents